United States Patent
Fukatsu (10) Patent No.: US 11,383,691 B2
(45) Date of Patent: Jul. 12, 2022

(54) FUEL CELL SYSTEM, CONTROL METHOD OF FUEL CELL SYSTEM, AND COMPUTER PROGRAM

(71) Applicant: BROTHER KOGYO KABUSHIKI KAISHA, Nagoya (JP)

(72) Inventor: Yoshiaki Fukatsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 733 days.

(21) Appl. No.: 16/365,189

(22) Filed: Mar. 26, 2019

(65) Prior Publication Data
US 2019/0217846 A1  Jul. 18, 2019

Related U.S. Application Data

(63) Continuation of application No. PCT/JP2017/034675, filed on Sep. 26, 2017.

(30) Foreign Application Priority Data

Sep. 27, 2016 (JP) .............................. JP2016-188064

(51) Int. Cl.
  *B60W 10/28* (2006.01)
  *H01M 8/04089* (2016.01)
  (Continued)

(52) U.S. Cl.
  CPC .............. *B60W 10/28* (2013.01); *H01M 8/04* (2013.01); *H01M 8/04097* (2013.01); *H01M 8/04753* (2013.01); *H01M 8/10* (2013.01)

(58) Field of Classification Search
  None
  See application file for complete search history.

(56) References Cited

U.S. PATENT DOCUMENTS

| 2010/0255394 A1 | 10/2010 | Wake et al. |
| 2011/0212371 A1* | 9/2011 | Itoga ............... H01M 8/04164 429/414 |

(Continued)

FOREIGN PATENT DOCUMENTS

| EP | 3 021 405 A1 | 5/2016 |
| JP | 2007-172913 A | 7/2007 |

(Continued)

OTHER PUBLICATIONS

KR 10-0974734 English translation. Shim et al. Korea. Aug. 6, 2010. (Year: 2010).*

(Continued)

*Primary Examiner* — Christopher P Domone
(74) *Attorney, Agent, or Firm* — K&L Gates LLP (57) ABSTRACT

A fuel cell system comprises a fuel cell stack configured to react hydrogen and oxygen, a hydrogen supply passage for supplying hydrogen, a hydrogen circulation passage for returning anode waste gas discharged from an anode to the hydrogen supply passage, a hydrogen circulation pump, has an inlet and an outlet, and operates to circulate the anode waste gas, a waste gas discharge passage for discharging the anode waste gas, a first discharge valve, a gas-liquid separator, a water discharge passage, a second discharge valve configured to put the water discharge passage into an open or a close state, and a control unit to switch the first discharge valve and the second discharge valve into an open or a close state, and the control unit performs control to deviate a period when the first discharge valve is open and a period when the second discharge valve is open from each other.

8 Claims, 6 Drawing Sheets

(51) Int. Cl.
*H01M 8/04746* (2016.01)
*H01M 8/04* (2016.01)
*H01M 8/10* (2016.01)

(56) References Cited

U.S. PATENT DOCUMENTS

2016/0141655 A1* 5/2016 Naganuma ............ B60L 3/0053
429/414
2016/0141660 A1 5/2016 Yamamoto et al.

FOREIGN PATENT DOCUMENTS

| JP | 2010-108756 A | 5/2010 |
| JP | 2010-244778 A | 10/2010 |
| JP | 2010282821 | * 12/2010 |
| JP | 2013-246935 A1 | 12/2013 |
| JP | 2016-095999 A1 | 5/2016 |
| KR | 10-0974734 B1 | 8/2010 |

OTHER PUBLICATIONS

JP 2010-282821 English translation. Naganuma et al. Japan. Dec. 16, 2010. (Year: 2010).*
International Preliminary Report on Patentability issued in connection with International Patent Application No. PCT/JP2017/034675, dated Apr. 2, 2019. (6 pages).
European search issued in corresponding European Patent Application No. 17856093.4, dated Apr. 14, 2020 (6 pages).
Japanese Office Action dated Dec. 8, 2020 issued in corresponding Japanese Patent Application No. 2016-188064. (6 pages).
International Search Report and Written Opinion issued in connection with related International Patent Application No. PCT/JP2017/034675, dated Dec. 26, 2017. (9 pages).

* cited by examiner

FUEL CELL SYSTEM, CONTROL METHOD OF FUEL CELL SYSTEM, AND COMPUTER PROGRAM

CROSS-REFERENCE TO RELATED APPLICATIONS

This application is a continuation application of PCT International Application No. PCT/JP2017/034675 which has International filing date of Sep. 26, 2017 and designated the United States of America, and claiming priority on Patent Application No. 2016-188064 filed in Japan on Sep. 27, 2016.

FIELD

The present disclosure relates to a fuel cell system comprising a fuel cell stack configured to electrochemically react hydrogen and oxygen so as to generate electricity, a hydrogen circulation passage through which anode waste gas discharged from the fuel cell stack is circulated, a hydrogen circulation pump provided at the hydrogen circulation passage, and a discharge valve configured to discharge anode waste gas to outside, to a control method of a fuel cell system, and to a computer program for executing control processing of a fuel cell system.

BACKGROUND AND SUMMARY

Some of fuel cell systems that obtain electromotive force by an electrochemical reaction of hydrogen and oxygen are provided with a hydrogen circulation passage through which anode waste gas discharged from an anode of a fuel cell stack is circulated, so that residual hydrogen included in the anode waste gas is effectively used. Regarding such a fuel cell system, anode waste gas includes impurities such as nitrogen or water vapor, and therefore the concentration of such impurities may possibly increase at an anode, the hydrogen concentration may possibly relatively decrease, and the performance of the fuel cell stack may possibly deteriorate as the anode waste gas is circulated and power generation is continued. Therefore, a technique for suppressing deterioration in the performance of the fuel cell stack has been known in which a discharge valve for discharging a part of anode waste gas to outside is provided at a hydrogen circulation passage, and the impurities are discharged to outside by periodically putting the discharge valve into an open state.

Moreover, water is generated at a cathode of the fuel cell stack. When generated water passes through an electrolyte membrane under osmotic pressure or a concentration difference, infiltrates to the anode side, and is stored on the anode side, a so-called flooding phenomenon in which water stays may possibly occur, and the power generation performance of the fuel cell stack may possibly deteriorate.

In order to solve such problems, a technique for suppressing deterioration in the performance of a stack has been known in which a discharge valve provided at a hydrogen circulation passage is periodically opened so that impurities such as nitrogen or water vapor and water are discharged to outside.

An example of a conventional fuel cell system is provided with an air discharge valve and a water discharge valve that are discharge valves at anode off-gas piping and corrects the open time of the air discharge valve and the open time of the water discharge valve based on the atmospheric pressure. The conventional fuel cell system, however, disregards the relation between the opening/closing timing of the air discharge valve and the opening/closing timing of the water discharge valve.

In the case of such a hydrogen circulation type fuel cell system provided with an air discharge valve and a water discharge valve, the pressure in the hydrogen circulation passage normally lowers when the air discharge valve or the water discharge valve is put into an open state. For example, when the air discharge valve is put into an open state while the water discharge valve is in an open state, the internal pressure lowers, water discharge may possibly become insufficient, and it may possibly become impossible to discharge a required amount of water. On the contrary, in a case where the water discharge valve is put into an open state while the air discharge valve is in an open state, the internal pressure also lowers, and air discharge may also possibly become insufficient.

An object of the present disclosure is to provide a fuel cell system that can suppress lowering of the internal pressure by controlling the timing of putting an air discharge valve into an open state and the timing of putting a water discharge valve into an open state and sufficiently discharge impurities at the time of air discharge or water discharge.

In the present disclosure, the fuel cell system comprises a fuel cell stack configured to react hydrogen and oxygen so as to generate electricity, a hydrogen supply passage for supplying hydrogen to the fuel cell stack, a hydrogen circulation passage for returning anode waste gas discharged from an anode of the fuel cell stack to the hydrogen supply passage, a hydrogen circulation pump that is provided at the hydrogen circulation passage, has an inlet and an outlet, and operates to circulate the anode waste gas, a waste gas discharge passage for discharging the anode waste gas to outside, the waste gas discharge passage being branched from a part of the hydrogen circulation passage between the anode and the inlet of the hydrogen circulation pump, a first discharge valve configured to put the waste gas discharge passage into an open state or a close state, a gas-liquid separator that is disposed at the hydrogen circulation passage and can separate a water component included in the anode waste gas, a water discharge passage for discharging the water component separated by the gas-liquid separator to outside, the water discharge passage being connected with the gas-liquid separator, a second discharge valve configured to put the water discharge passage into an open state or a close state, and a control unit configured to switch the first discharge valve and the second discharge valve into an open state or a close state, and the control unit performs control to deviate a period when the first discharge valve is in an open state and a period when the second discharge valve is in an open state from each other.

In the present disclosure, a control method of controlling a first discharge valve and a second discharge valve by a control unit of a fuel cell system is disclosed and the fuel cell system comprises a fuel cell stack configured to react hydrogen and oxygen so as to generate electricity, a hydrogen supply passage for supplying hydrogen to the fuel cell stack a hydrogen circulation passage for returning anode waste gas discharged from an anode of the fuel cell stack to the hydrogen supply passage a hydrogen circulation pump that is provided at the hydrogen circulation passage, has an inlet and an outlet, and operates to circulate the anode waste gas, a waste gas discharge passage for discharging the anode waste gas to outside, the waste gas discharge passage being branched from a part of the hydrogen circulation passage between the anode and the inlet of the hydrogen circulation pump, a first discharge valve configured to put the waste gas discharge passage into an open state or a close state, a gas-liquid separator that is disposed at the hydrogen circulation passage and can separate a water component included in the anode waste gas, a water discharge passage for discharging the water component separated by the gas-liquid separator to outside, the water discharge passage being connected with the gas-liquid separator, a second discharge valve configured to put the water discharge passage into an open state or a close state and the control unit configured to control the first discharge valve and the second discharge valve. The control unit performs control to deviate a period when the first discharge valve is in an open state and a period when the second discharge valve is in an open state from each other.

In the present disclosure, a non-transitory computer-readable recording medium recoding a computer program of a control unit of a fuel cell system comprising, a fuel cell stack configured to react hydrogen and oxygen so as to generate electricity, a hydrogen supply passage for supplying hydrogen to the fuel cell stack, a hydrogen circulation passage for returning anode waste gas discharged from an anode of the fuel cell stack to the hydrogen supply passage, a hydrogen circulation pump that is provided at the hydrogen circulation passage, has an inlet and outlet, and operates to circulate the anode waste gas, a waste gas discharge passage for discharging the anode waste gas to outside, the waste gas discharge passage being branched from a part of the hydrogen circulation passage between the anode and the inlet of the hydrogen circulation pump, a first discharge valve configured to put the waste gas discharge passage into an open state or a close state, a gas-liquid separator that is disposed at the hydrogen circulation passage and can separate a water component included in the anode waste gas, a water discharge passage for discharging the water component separated by the gas-liquid separator to outside, the water discharge passage being connected with the gas-liquid separator, and a second discharge valve configured to put the water discharge passage into an open state or a close state. The control unit switches the first discharge valve and the second discharge valve into an open state or a close state, and the computer program causes the control unit to execute a process of performing control to deviate a period when the first discharge valve is in an open state and a period when the second discharge valve is in an open state from each other.

The above and further objects and features will more fully be apparent from the following detailed description with accompanying drawings.

DETAILED DESCRIPTION OF NON-LIMITING EXAMPLE EMBODIMENTS

First Embodiment

The following description will explain First Embodiment of the present invention with reference to the drawings.

Figure 1:
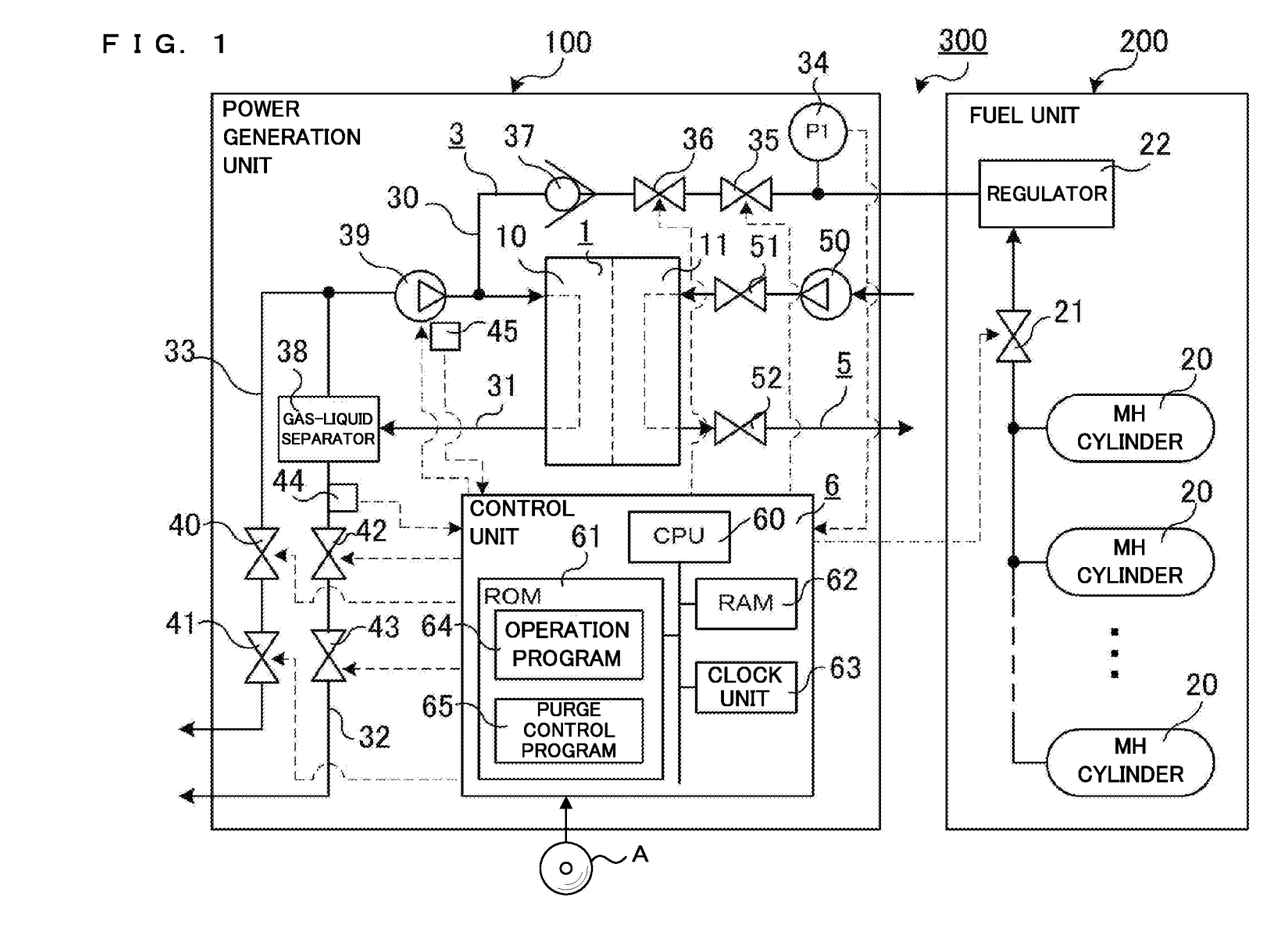
FIG. 1 is a block diagram showing an arrangement of each configuration of a fuel cell system according to the first embodiment.

A fuel cell system 300 is provided with a power generation unit 100 and a fuel unit 200.

The power generation unit 100 is provided with a fuel cell stack 1, a hydrogen passage 3, an air passage 5, and a control unit 6. The fuel cell stack 1 will be hereinafter shortened as a stack 1.

The fuel unit 200 is provided with a plurality of MH (Metal Hydride) cylinders 20, a primary hydrogen shut-off valve 21, and a regulator 22. Each MH cylinder is filled with hydrogen absorbing alloy. The primary hydrogen shut-off valve 21 is connected with all MH cylinders 20 and is also connected with the regulator 22. The regulator 22 adjusts the hydrogen supply pressure. A reaction to occur when hydrogen absorbing alloy releases hydrogen is an endothermic reaction, and each MH cylinder 20 supplies hydrogen at a temperature equal to or higher than a predetermined temperature.

The stack 1 is prepared by sandwiching a solid polymer electrolyte membrane with an anode 10 and a cathode 11 from both sides so as to form a membrane electrode assembly, arranging a pair of separators on both sides of the membrane electrode assembly so as to construct a tabular unit cell, and laminating a plurality of such unit cells.

When fuel gas including hydrogen that has flown from the fuel unit 200 comes into contact with the anode 10 of the stack 1 and oxidant gas including oxygen such as air flows in from the air passage 5 and comes into contact with the cathode 11, an electrochemical reaction occurs at both electrodes and generates electromotive force and water.

<Hydrogen Passage>

The hydrogen passage 3 is composed of a hydrogen supply passage 30, a hydrogen circulation passage 31, a water discharge passage 32, and a waste gas discharge passage 33. One end portion of the hydrogen supply passage 30 is connected with the regulator 22, while the other end portion is connected with the inlet side of the anode 10 of the stack 1. At the hydrogen supply passage 30, a first pressure sensor 34, a secondary hydrogen shut-off valve 35, a secondary hydrogen shut-off valve 36, and a check valve 37 are provided toward the flow direction of fuel gas.

One end portion of the hydrogen circulation passage 31 is connected with the outlet side of the anode 10, while the other end portion is connected with the hydrogen supply passage 30. The hydrogen circulation passage 31 is provided with a gas-liquid separator 38 and a hydrogen circulation pump 39. The hydrogen circulation pump 39 is a pump, such as a diaphragm pump, for example, of a type in which backflow from the outlet to the inlet is prevented. The hydrogen circulation pump 39 is provided with a tachometer 45 configured to detect the rotational speed of the hydrogen circulation pump 39. It is to be noted that not a tachometer 45 but a rotational speed output function of the hydrogen circulation pump 39 may be utilized in a case where the hydrogen circulation pump 39 is provided with a function of outputting the rotational speed.

When the primary hydrogen shut-off valve 21, the secondary hydrogen shut-off valve 35, and the secondary hydrogen shut-off valve 36 are opened, hydrogen flows through the hydrogen supply passage 30 and flows through the anode 10 of the stack 1. The first pressure sensor 34 measures the pressure of hydrogen in the hydrogen supply passage 30. Hydrogen, impurities, and a water component that have flown through the anode 10 and have been discharged from the outlet flow through the hydrogen circulation passage 31 and are delivered to the gas-liquid separator 38. Impurities include, for example, nitrogen preliminarily contained in supplied hydrogen. The gas-liquid separator 38 separates water and gas including hydrogen and impurities inside the gas-liquid separator 38.

The waste gas discharge passage 33 is provided to be branched and extend from the hydrogen circulation passage 31 above the gas-liquid separator 38, and an air discharge valve 40 and an air discharge valve 41 that are first discharge valves for discharging gas including hydrogen and impurities to outside are provided in series at the waste gas discharge passage 33. The air discharge valve 40 and the air discharge valve 41 according to First Embodiment are electromagnetic valves that are put into an open state when being energized. Gas including hydrogen and impurities are discharged to outside when the air discharge valve 40 and the air discharge valve 41 are energized and put into an open state with predetermined timing. It is to be noted that the air discharge valve 40 and the air discharge valve 41 may be electromagnetic valves that are put into a close state when being energized.

Gas including hydrogen and impurities separated from the gas-liquid separator 38 flow from the gas-liquid separator 38 through the hydrogen circulation passage 31, are delivered to the hydrogen circulation pump 39, and are supplied via the hydrogen supply passage 30 to the anode 10 of the stack 1 when the air discharge valve 40 and the air discharge valve 41 are close.

The water discharge passage 32 is connected with a lower side of the gas-liquid separator 38 and is disposed to extend downward from the gas-liquid separator 38. A water discharge valve 42 and a water discharge valve 43 that are second discharge valves for discharging water are provided in series at the water discharge passage 32. The water discharge valve 42 and the water discharge valve 43 according to First Embodiment are electromagnetic valves that are put into an open state when being energized. It is to be noted that the water discharge valve 42 and the water discharge valve 43 may be electromagnetic valves that are put into a close state when being energized. A liquid level sensor 44 is provided between the gas-liquid separator 38 and the water discharge valve 42. Water is stored in the water discharge passage 32 in a state where the water discharge valve 42 and the water discharge valve 43 are close. The liquid level sensor 44 detects whether a predetermined amount of water is stored in the water discharge passage 32 or not. The liquid level sensor 44 is put into an energization ON state when detecting that a predetermined amount of water is stored, for example.

Water separated by the gas-liquid separator 38 is stored in the water discharge passage 32, is caused to flow through the water discharge passage 32 when the water discharge valve 42 and the water discharge valve 43 are put into an open state in water discharge processing that will be described later, and is discharged to outside.

<Air Passage>

The air passage 5 is provided with an air pump 50. In addition, an air shut-off valve 51 is provided at a flow-in side portion of the air passage 5 to the stack 1, and an air shut-off valve 52 is provided at a flow-out side portion from the stack 1. When the air shut-off valve 51 and the air shut-off valve 52 are opened, air from the air pump 50 flows through the air passage 5 and flows through the cathode 11 of the stack 1. Air that has flown through the cathode 11 is discharged from the stack 1, flows through the air shut-off valve 52, and is discharged to outside.

<Control Unit>

The control unit 6 is provided with a CPU (Central Processing Unit) 60 configured to control the operation of the respective components of the control unit 6. The CPU 60 is connected with a ROM 61, a RAM 62, and a clock unit 63 via a bus.

The ROM 61 is a nonvolatile memory such as an EEPROM (Electrically Erasable Programmable ROM), for example, and stores an operation program 64 of the fuel cell 300, and a purge control program 65. The purge control program 65 is recorded in a recording medium such as a CD (Compact Disc)-ROM that is a portable medium recorded in a computer-readable manner, a DVD (Digital Versatile Disc)-ROM, a BD (Blu-ray (registered trademark) Disc), a hard disk drive, or a solid state drive, and the CPU 60 may read out the purge control program 65 from the recording medium and store the purge control program 65 in the RAM 62. Furthermore, the purge control program 65 may be acquired from an external computer that is connected with a communication network and is not illustrated in the figures and be stored in the RAM 62. The purge control program 65 is a program for controlling putting the air discharge valve 40, the air discharge valve 41, the water discharge valve 42, and the water discharge valve 43 into an open state or a close state.

The RAM 62 is a memory such as a DRAM (Dynamic RAM) or an SRAM (Static RAM), for example, and temporarily stores the operation program 64 read out from the ROM 61 in the process of executing the operation processing of the CPU 60, the purge control program 65, and various data to be generated in operation processing of the CPU 60.

The control unit 6 is connected with the respective components of the power generation unit 100 and with the primary hydrogen shut-off valve 21 of the fuel unit 200, and the control unit 6 controls the operation of the respective components and the primary hydrogen shut-off valve 21. Moreover, the control unit 6 is connected with the first pressure gauge 34 and acquires a pressure value in the hydrogen supply passage 30 from the first pressure gauge 34. Moreover, the control unit 6 is connected with the tachometer 45 and acquires the rotational speed of the hydrogen circulation pump 39 from the tachometer 45. It is to be noted that FIG. 1 shows only a part, which is necessary for description of this embodiment, of connection between the control unit 6 and the respective components.

<Operation of Fuel Cell System 300>

The CPU 60 reads out the operation program 64 stored in the ROM 61 and causes the fuel cell system 300 to operate. The CPU 60 outputs commands to the respective components provided in the power generation unit 100. The respective structures of the power generation unit 100 that have accepted the commands supply oxidant gas including oxygen from the air passage 5 to the cathode 11 of the stack 1 and supply fuel gas from the fuel unit 200 to the anode 10 of the stack 1. Specifically, the CPU 60 outputs a command to send out air to the air pump 50, and oxidant gas is supplied to the stack 1. Moreover, the CPU 60 outputs a command to get into an open state to the primary hydrogen shut-off valve 21, the secondary hydrogen shut-off valve 35, and the secondary hydrogen shut-off valve 36, and fuel gas is supplied to the stack 1. This causes an electrochemical reaction to occur at the stack 1, and electricity is generated.

Unreacted fuel gas including unreacted hydrogen in power generation by the power generation unit 100 is delivered to the gas-liquid separator 38. Moreover, water and nitrogen that has flown from the cathode 11 through the electrolyte membrane and has been mixed into the anode 10 are also delivered to the gas-liquid separator 38. The gas-liquid separator 38 separates water and delivered gas containing unreacted fuel gas and nitrogen mixed therein.

Gas separated by the gas-liquid separator 38 is delivered via the hydrogen circulation pump 39 to the hydrogen supply passage 30 and is supplied to the anode 10 of the stack 1. This causes the power generation unit 100 to generate electricity by reusing unreacted fuel gas.

In a case where power generation is performed for more than a predetermined time, the concentration of nitrogen in gas circulated in the hydrogen circulation passage 31 increases. Moreover, water is stored in the water discharge passage 32. Accordingly, the power generation unit 100 is required to discharge gas in the hydrogen circulation passage 31 and water in the water discharge passage 32 in order to maintain the performance. The power generation unit 100 puts the air discharge valve 40 and the air discharge valve 41, or the water discharge valve 42 and the water discharge valve 43 into an open state with timing that will be described later, so as to discharge gas in the hydrogen circulation passage 31 and water in the water discharge passage 32.

The power generation unit 100 maintains the power generation performance by discharging impurities. Moreover, the control unit 6 acquires the rotational speed of the hydrogen circulation pump 39 from the tachometer 45 and controls the output of the hydrogen circulation pump 39 in accordance with the power generation amount of the stack 1. However, in a case where the output of the hydrogen circulation pump 39 is high as in high output operation, for example, the pressure at the outlet becomes high with respect to the pressure at the inlet of the hydrogen circulation pump 39. At this time, the pressure at the outlet of the hydrogen circulation pump 39 is equal to the pressure in the hydrogen supply passage 30. The pressure at the inlet of the hydrogen circulation pump 39 however becomes relatively low with respect to the pressure in the hydrogen supply passage 30 and sometimes becomes a negative pressure with respect to the atmospheric pressure. When the air discharge valve 40 and the air discharge valve 41, or the water discharge valve 42 and the water discharge valve 43 are put into an open state in such a state, atmospheric air flows backward, and it becomes impossible to discharge gas in the hydrogen circulation passage 31 and water in the water discharge passage 32. Moreover, when the water discharge valve 42 and the water discharge valve 43 are put into an open state while air discharge is being performed, the pressure in the water circulation passage 31 lowers, and air discharge may possibly become insufficient. Moreover, when the air discharge valve 40 and the air discharge valve 41 are put into an open state while water discharge is being performed, water discharge may possibly become insufficient. In other words, the pressure in the hydrogen circulation passage 31 lowers when the air discharge valve 40, the air discharge valve 41, the water discharge valve 42, and the water discharge valve 43 are put into an open state simultaneously. This makes air discharge and water discharge by the power generation unit 100 insufficient. Accordingly, the control unit 6 executes the following control so as to achieve sufficient air discharge and water discharge.

<Processing of Purge Control Program 65>

In this embodiment, the CPU 60 reads out the purge control program 65 from the ROM 61 and executes processing of air discharge and water discharge when the power generation unit 100 starts power generation.

Figure 2:
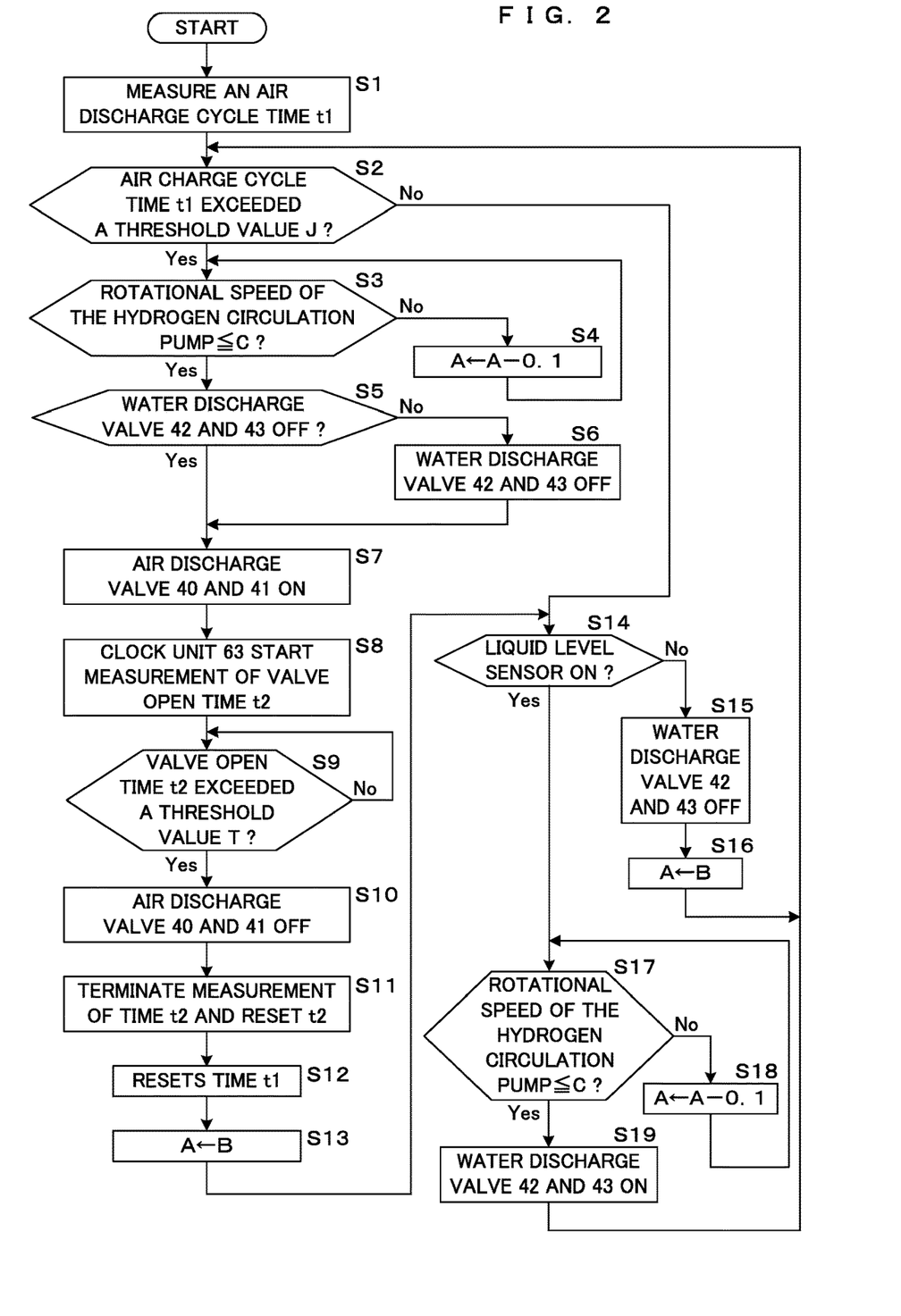
FIG. 2 is a flowchart illustrating the process procedures of air discharge and water discharge according to the first embodiment.

FIG. 2 is a flowchart illustrating the process procedures of air discharge and water discharge by the CPU 60. In the initial state, the power generation unit 100 is performing power generation, and the air discharge valve 40, the air discharge valve 41, the water discharge valve 42, and the water discharge valve 43 are in a close state of energization OFF. The CPU 60 starts processing of air discharge and water discharge from such a state.

The CPU 60 causes the clock unit 63 to measure an air discharge cycle time t1 (S1). Here, the air discharge cycle time t1 is an elapsed time from when the power generation unit 100 starts power generation for the first time of air discharge, or is an elapsed time from when purge is performed last time from the second time of air discharge.

The CPU 60 determines whether the air charge cycle time t1 has exceeded a threshold value J or not (S2). Here, the threshold value J is a value set in accordance with the power generation amount of the power generation unit 100 and represents the air discharge cycle. For example, the threshold value J in First Embodiment represents 10 minutes. It is to be noted that the threshold value J may be shortened in a case where the power generation amount of the power generation unit 100 is large. The threshold value J may also be lengthened in a case where the power generation amount of the power generation unit 100 is small. When determining that the air discharge cycle time t1 has not exceeded the threshold value J (S2: NO), the CPU 60 advances the processing to step S14.

When determining that the air discharge cycle time t1 has exceeded the threshold value J (S2: YES), the CPU 60 determines whether the rotational speed of the hydrogen circulation pump 39 is equal to or lower than a threshold value C or not (S3). Here, the threshold value C is a value set considering the hydrogen supply pressure and represents the rotational speed of the hydrogen circulation pump 39. Since the pressure in the hydrogen supply passage 30 is equal to the pressure at the outlet of the hydrogen circulation pump 39 and the pressure at the inlet of the hydrogen circulation pump 39 becomes lower as the rotational speed of the hydrogen circulation pump 39 becomes higher, the threshold value C is set in a manner such that the pressure at the inlet of the hydrogen circulation pump 39 does not become lower than the atmospheric pressure. The threshold value C is set based on a pressure value acquired by the first pressure gauge 34.

When determining that the rotational speed of the hydrogen circulation pump 39 is not equal to or lower than the threshold value C (S3: NO), the CPU 60 subtracts 0.1 volt from a hydrogen circulation pump command voltage A (S4) and returns the processing to step S3. That is, 0.1 volt is subtracted each time from the hydrogen circulation pump command voltage A until the rotational speed of the hydrogen circulation pump 39 becomes equal to or lower than the threshold value C.

When determining that the rotational speed of the hydrogen circulation pump 39 is equal to or lower than the threshold value C (S3: YES), the CPU 60 determines whether the water discharge valve 42 and the water discharge valve 43 are in a close state of energization OFF or not (S5). When determining that the water discharge valve 42 and the water discharge valve 43 are not in a close state of energization OFF (S5: NO), the CPU 60 puts the water discharge valve 42 and the water discharge valve 43 into a close state of energization OFF (S6). That is, water discharge is interrupted when water discharge is being performed.

When determining that the water discharge valve 42 and the water discharge valve 43 are in a close state of energization OFF (S5: YES), the CPU 60 puts the air discharge valve 40 and the air discharge valve 41 into an open state of energization ON and starts air discharge (S7). Next, the CPU 60 causes the clock unit 63 to start measurement of an air discharge valve open time t2 (S8). Here, the air discharge valve open time t2 is a time in which the air discharge valve 40 and the air discharge valve 41 are in an open state.

The CPU 60 determines whether the air discharge valve open time t2 has exceeded a threshold value T or not (S9). When determining that the air discharge valve open time t2 has not exceeded the threshold value T (S9: NO), the CPU 60 repeats the determination described above. When determining that the air discharge valve open time t2 has exceeded the threshold value T (S9 YES), the CPU 60 puts the air discharge valve 40 and the air discharge valve 41 into a close state of energization OFF and terminates air discharge (S10). Here, the threshold value T is a value representing an air discharge period decided considering the internal volume of the hydrogen circulation passage 31 and represents a time in which impurities in the hydrogen circulation passage 31 can be sufficiently discharged by air discharge. The threshold value T represents 10 seconds, for example.

The CPU 60 terminates measurement of the air discharge valve open time t2 by the clock unit 63 and resets t2 back to zero (S11). The CPU 60 resets the air discharge cycle time t1 back to zero (S12).

The CPU 60 sets a hydrogen circulation pump command voltage A to B (S13). Here, B is a voltage value set based on the power generation amount of the power generation unit 100. B becomes larger as the power generation amount becomes larger. That is, the circulation amount in the hydrogen circulation passage 31 is made larger as the power generation amount becomes larger. For example, B is an initial value of the hydrogen circulation pump command voltage A, and the hydrogen circulation pump command voltage A obtained by subtraction in S4 is set to B that is an initial value.

The CPU 60 determines whether the liquid level sensor 44 is energization ON or not (S14). When determining that the liquid level sensor 44 is not energization ON (S14: NO), the CPU 60 puts the water discharge valve 42 and the water discharge valve 43 into a close state of energization OFF (S15), sets the hydrogen circulation pump command voltage A to B (S16), and returns the processing to step S2.

When determining in step S14 that the liquid level sensor 44 is energization ON (S14: YES), the CPU 60 determines whether the rotational speed of the hydrogen circulation pump 39 is equal to or lower than a threshold value C or not (S17).

When determining that the rotational speed of the hydrogen circulation pump 39 is not equal to or lower than the threshold value C (S17: NO), the CPU 60 subtracts 0.1 volt from the hydrogen circulation pump command voltage A (S18) and returns the processing to step S17. That is, 0.1 volt is subtracted each time from the hydrogen circulation pump command voltage A until the rotational speed of the hydrogen circulation pump 39 become equal to or lower than the threshold value C.

When determining that the rotational speed of the hydrogen circulation pump 39 is equal to or lower than the threshold value C (S17: YES), the CPU 60 puts the water discharge valve 42 and the water discharge valve 43 into an open state of energization ON (S19) and returns the processing to step S2.

As described above, with this embodiment in which the rotational speed of the hydrogen circulation pump 39 is lowered and the pressure at the inlet of the hydrogen circulation pump 39 is made higher than the atmospheric pressure at the time of air discharge or water discharge, it is possible to sufficiently discharge impurities and water.

In First Embodiment, the air discharge valve 40 and the air discharge valve 41 are not put into an open state simultaneously with the water discharge valve 42 and the water discharge valve 43. Therefore, the pressure in the hydrogen circulation passage 31 is not excessively lowered by water discharge during air discharge, and impurities can be sufficiently discharged. Moreover, when a set air discharge cycle time comes during water discharge, water discharge is interrupted, and air discharge is prioritized. It is therefore possible to sufficiently discharge impurities without being affected by water discharge.

Second Embodiment

Next, Second Embodiment of the present invention will be described with reference to FIG. 3. Second Embodiment has process procedures of air discharge and water discharge different from First Embodiment. It is to be noted that the structure excluding the process procedures of air discharge and water discharge is similar to First Embodiment described above, and therefore detailed description thereof will be omitted.

<Purge Control Program>

Figure 3:
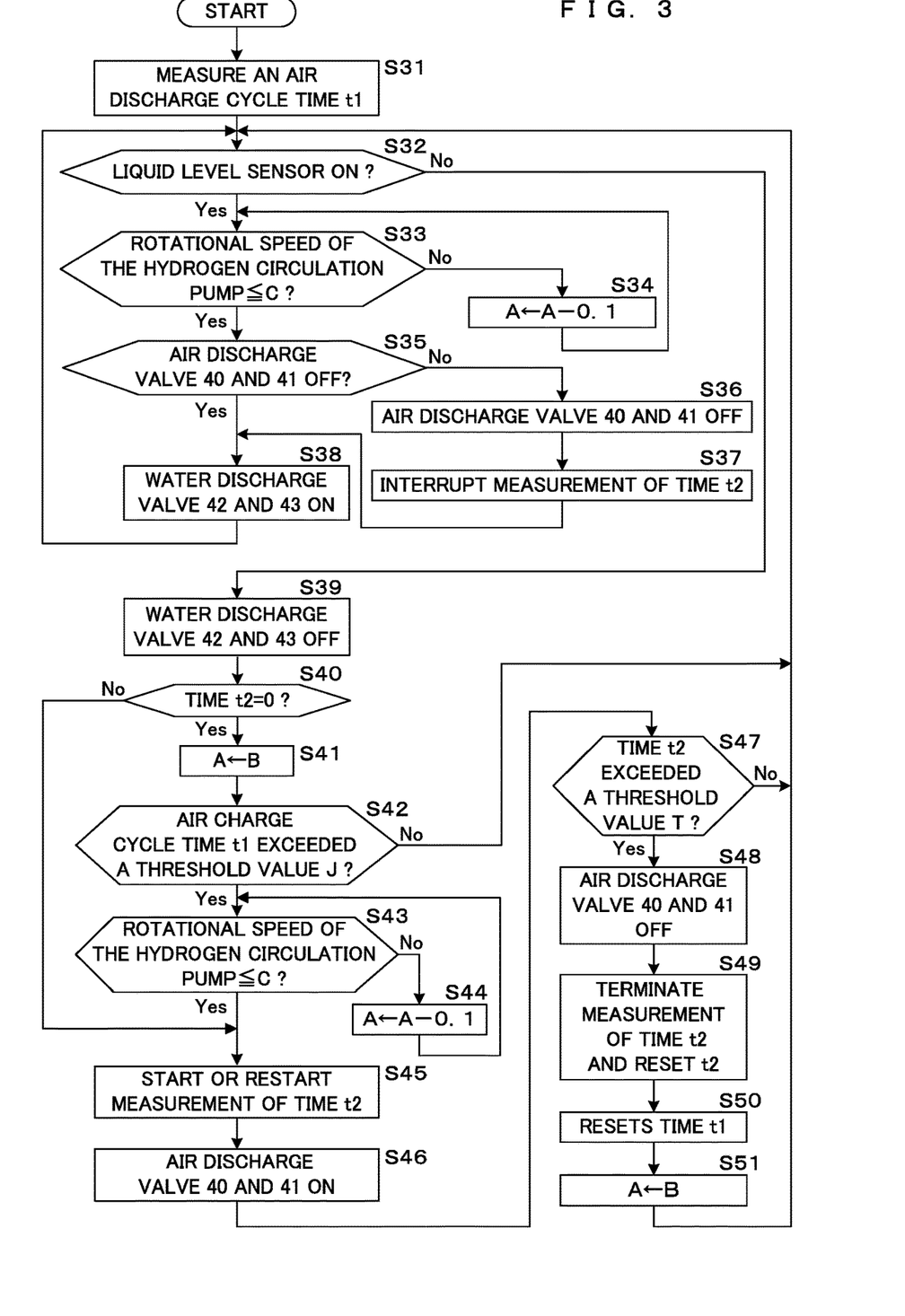
FIG. 3 is a flowchart illustrating the process procedures of air discharge and water discharge according to the second embodiment.

FIG. 3 is a flowchart illustrating the process procedures of air discharge and water discharge by the CPU 60. In the initial state, the power generation unit 100 is performing power generation, and the air discharge valve 40, the air discharge valve 41, the water discharge valve 42, and the water discharge valve 43 are in a close state of energization OFF. The CPU 60 starts processing of air discharge and water discharge from such a state.

The CPU 60 causes the clock unit 63 to start measurement of an air discharge cycle time t1 (S31). Here, the air discharge cycle time t1 is an elapsed time from when the power generation unit 100 starts power generation for the first time of air discharge, or an elapsed time from when air discharge is performed last time from the second time of air discharge.

The CPU 60 determines whether the liquid level sensor 44 is energization ON or not (S32). When determining that the liquid level sensor 44 is energization ON (S32: YES), the CPU 60 determines whether the rotational speed of the hydrogen circulation pump 39 is equal to or lower than a threshold value C or not (S33). Here, the threshold value C is a value set considering the hydrogen supply pressure and represents the rotational speed of the hydrogen circulation pump 39. Since the pressure in the hydrogen supply passage 30 is equal to the pressure at the outlet of the hydrogen circulation pump 39 and the pressure at the inlet of the hydrogen circulation pump 39 becomes lower as the rotational speed of the hydrogen circulation pump 39 becomes higher, the threshold value C is set in a manner such that the pressure at the inlet of the hydrogen circulation pump 39 does not become lower than the atmospheric pressure. The threshold value C is set based on a pressure value acquired by the first pressure gauge 34.

When determining that the rotational speed of the hydrogen circulation pump 39 is not equal to or lower than the threshold value C (S33: NO), the CPU 60 subtracts 0.1 from the hydrogen circulation pump command voltage A (S34) and returns the processing to step S33. That is, 0.1 volt is subtracted each time from the hydrogen circulation pump command voltage A until the rotational speed of the hydrogen circulation pump 39 becomes equal to or lower than the threshold value C.

When determining that the rotational speed of the hydrogen circulation pump 39 is equal to or lower than the threshold value C (S33: YES), the CPU 60 determines whether the air discharge valve 40 and the air discharge valve 41 are in a close state of energization OFF or not (S35). When determining that the air discharge valve 40 and the air discharge valve 41 are not in a close state of energization OFF (S35: NO), the CPU 60 puts the air discharge valve 40 and the air discharge valve 41 into a close state of energization OFF (S36) and interrupts measurement of the air discharge valve open time t2 (S37). That is, air discharge is interrupted when air discharge is being performed. Here, the air discharge valve open time t2 is a time in which the air discharge valve 40 and the air discharge valve 41 are in an open state.

When determining that the air discharge valve 40 and the air discharge valve 41 are in a close state of energization OFF (S35: YES), the CPU 60 puts the water discharge valve 42 and the water discharge valve 43 into an open state of energization ON (S38) and returns the processing to step S32.

When determining in step S32 that the liquid level sensor 44 is not energization ON (S32: NO), the CPU 60 puts the water discharge valve 42 and the water discharge valve 43 into a close state of energization OFF (S39) and determines whether the air discharge valve open time t2 is zero or not (S40).

When determining that the air discharge valve open time t2 is not zero (S40: NO), the CPU 60 advances the processing to step S45 that will be described later.

When determining that the air discharge valve open time t2 is zero (S40: YES), the CPU 60 sets the hydrogen circulation pump command voltage A to B (S41). Here, B is a voltage value set based on the power generation amount of the power generation unit 100. B becomes larger as the power generation amount becomes larger. That is, the circulation amount in the hydrogen circulation passage 31 is made larger as the power generation amount becomes larger. For example, B is the initial value of the hydrogen circulation pump command voltage A, and the hydrogen circulation pump command voltage A obtained by subtraction in S34 is set to B that is the initial value.

The CPU 60 determines whether the air discharge cycle time t1 has exceeded a threshold value J or not (S42). Here, the threshold value J is a value set in accordance with the power generation amount of the power generation unit 100 and represents the air discharge cycle. For example, the threshold value J in Second Embodiment represents 10 minutes. It is to be noted that the threshold value J may be shortened in a case where the power generation amount of the power generation unit 100 is large. The threshold value J may also be lengthened in a case where the power generation amount of the power generation unit 100 is small. When determining that the air discharge cycle time t1 has not exceeded the threshold value J (S42: NO), the CPU 60 returns the processing to step S32.

When determining that the air discharge cycle time t1 has exceeded the threshold value J (S42: YES), the CPU 60 determines whether the rotational speed of the hydrogen circulation pump 39 is equal to or lower than the threshold value C or not (S43).

When determining that the rotational speed of the hydrogen circulation pump 39 is not equal to or lower than the threshold value C (S43: NO), the CPU 60 subtracts 0.1 volt from the hydrogen circulation pump command voltage A (S44) and returns the processing to step S43. That is, 0.1 volt is subtracted each time from the hydrogen circulation pump command voltage A until the rotational speed of the hydrogen circulation pump 39 becomes equal to or lower than the threshold value C.

When determining that the rotational speed of the hydrogen circulation pump 39 is equal to or lower than the threshold value C (S43: YES), the CPU 60 causes the clock unit 63 to start (restart in a case where measurement of t2 has been interrupted) measurement of the air discharge valve open time t2 (S45).

The CPU 60 puts the air discharge valve 40 and the air discharge valve 41 into an open state of energization ON and starts air discharge (S46).

The CPU 60 determines whether the air discharge valve open time t2 has exceeded a threshold value T or not (S47). When determining that the air discharge valve open time t2 has not exceeded the threshold value T (S47: NO), the CPU 60 returns the processing to step S32. Here, the threshold T is a value decided considering the internal volume of the hydrogen circulation passage 31 and is a time in which impurities in the hydrogen circulation passage 31 can be sufficiently discharged by air discharge. The threshold value T represents 10 seconds, for example.

When determining that the air discharge valve open time t2 has exceeded the threshold value T (S47: YES), the CPU 60 turns off (closes) the air discharge valve 40 and the air discharge valve 41 so as to terminate air discharge (S48), terminates measurement of the air discharge valve open time t2 by the clock unit 63, and resets t2 back to zero (S49). The CPU 60 resets measurement of the air discharge cycle time t1 by the clock unit 63 back to zero (S50).

The CPU 60 sets the hydrogen circulation pump command voltage A to B (S51) and returns the processing to step S32.

With Second Embodiment in which the rotational speed of the hydrogen circulation pump 39 is lowered and the pressure at the inlet of the hydrogen circulation pump 39 is made higher than the atmospheric pressure at the time of air discharge or water discharge, it is possible to sufficiently discharge impurities and water.

In Second Embodiment, the air discharge valve 40 and the air discharge valve 41 are not put into an open state simultaneously with the water discharge valve 42 and the water discharge valve 43. Therefore, the pressure in the hydrogen circulation passage 31 is not excessively lowered by air discharge during water discharge, and water can be sufficiently discharged. Moreover, in a case where the liquid level sensor becomes energization ON during air discharge, air discharge is interrupted, and water discharge is prioritized. It is therefore possible to reliably discharge water without being affected by air discharge.

Third Embodiment

Next, Third Embodiment will be described with reference to FIGS. 4 and 5. Third Embodiment is different from First Embodiment in a feature that a second pressure gauge 46 and a third pressure gauge 47 are provided and in the process procedures of air discharge and water discharge. It is to be noted that the structure excluding the feature that a second pressure gauge 46 and a third pressure gauge 47 are provided and the process procedures of air discharge and water discharge is similar to First Embodiment, and therefore detailed description thereof will be omitted.

One end portion of a hydrogen circulation passage 31 is connected with an outlet side of an anode 10, while the other end portion is connected with a hydrogen supply passage 30. In the hydrogen circulation passage 31, a gas-liquid separator 38, a second pressure gauge 46, and a hydrogen circulation pump 39 are provided in this order from the outlet side of the anode 10. The second pressure gauge 46 measures the pressure at a part in the hydrogen circulation passage 31 between the gas-liquid separator 38 and the hydrogen circulation pump 39.

A third pressure gauge 47 is disposed in a housing of the power generation unit 100. The third pressure gauge 47 measures the pressure in the housing of the power generation unit 100. The pressure in the housing of the power generation unit 100 is substantially equal to the atmospheric pressure.

Figure 4:
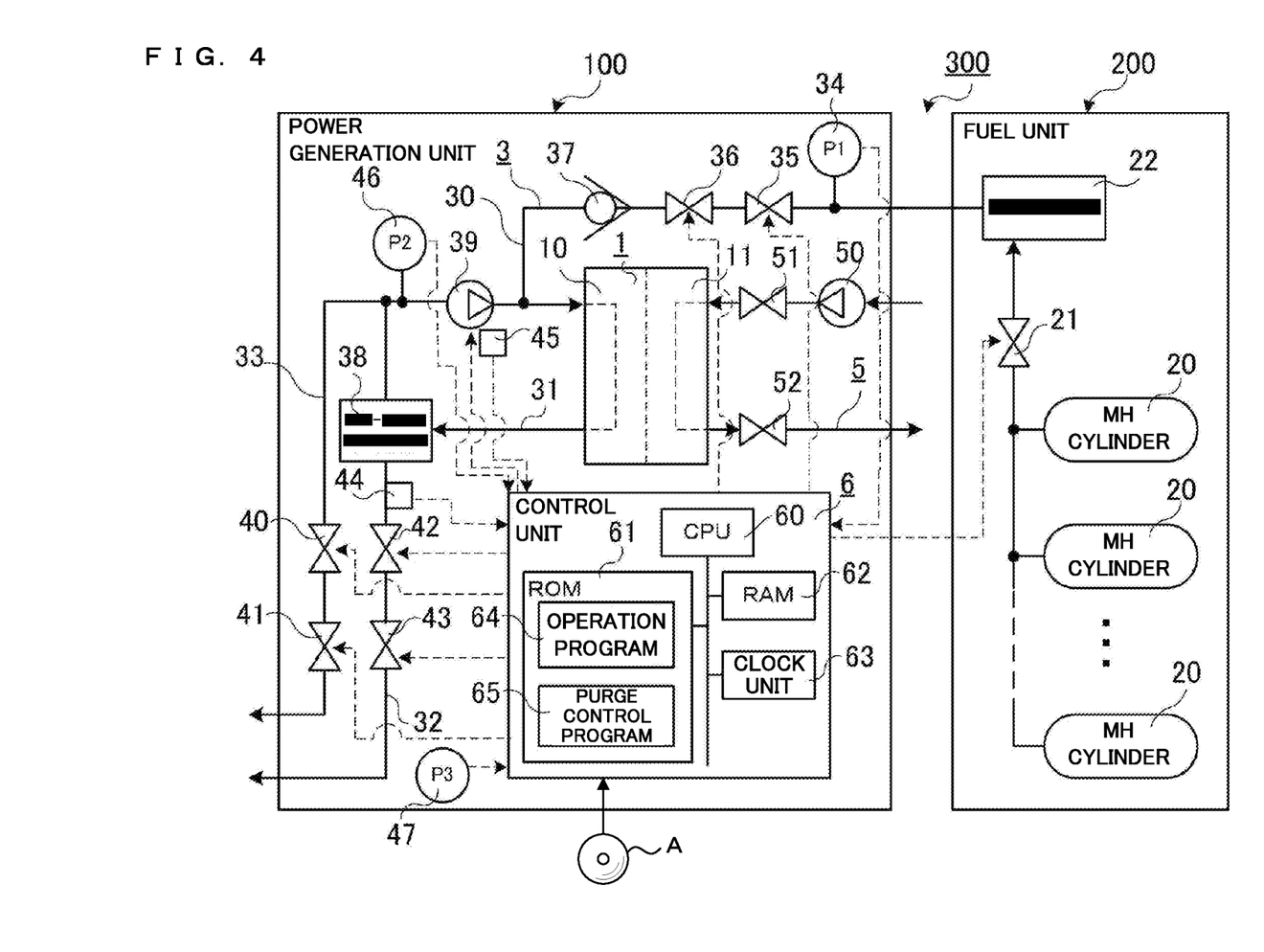
FIG. 4 is a block diagram showing a fuel cell system according to the third embodiment.

Referring to FIG. 4, a control unit 6 is connected with the second pressure gauge 46 and acquires a pressure value P2 on the inlet side of the hydrogen circulation pump 39 in the hydrogen circulation passage 31 from the second pressure gauge 46. The control unit 6 is also connected with the third pressure gauge 47 and acquires an atmospheric pressure P3 from the third pressure gauge 47. It is to be noted that FIG. 4 shows only a part, which is necessary for description of Third Embodiment, of connection between the control unit 6 and the respective components.

<Purge Control Program>

Figure 5:
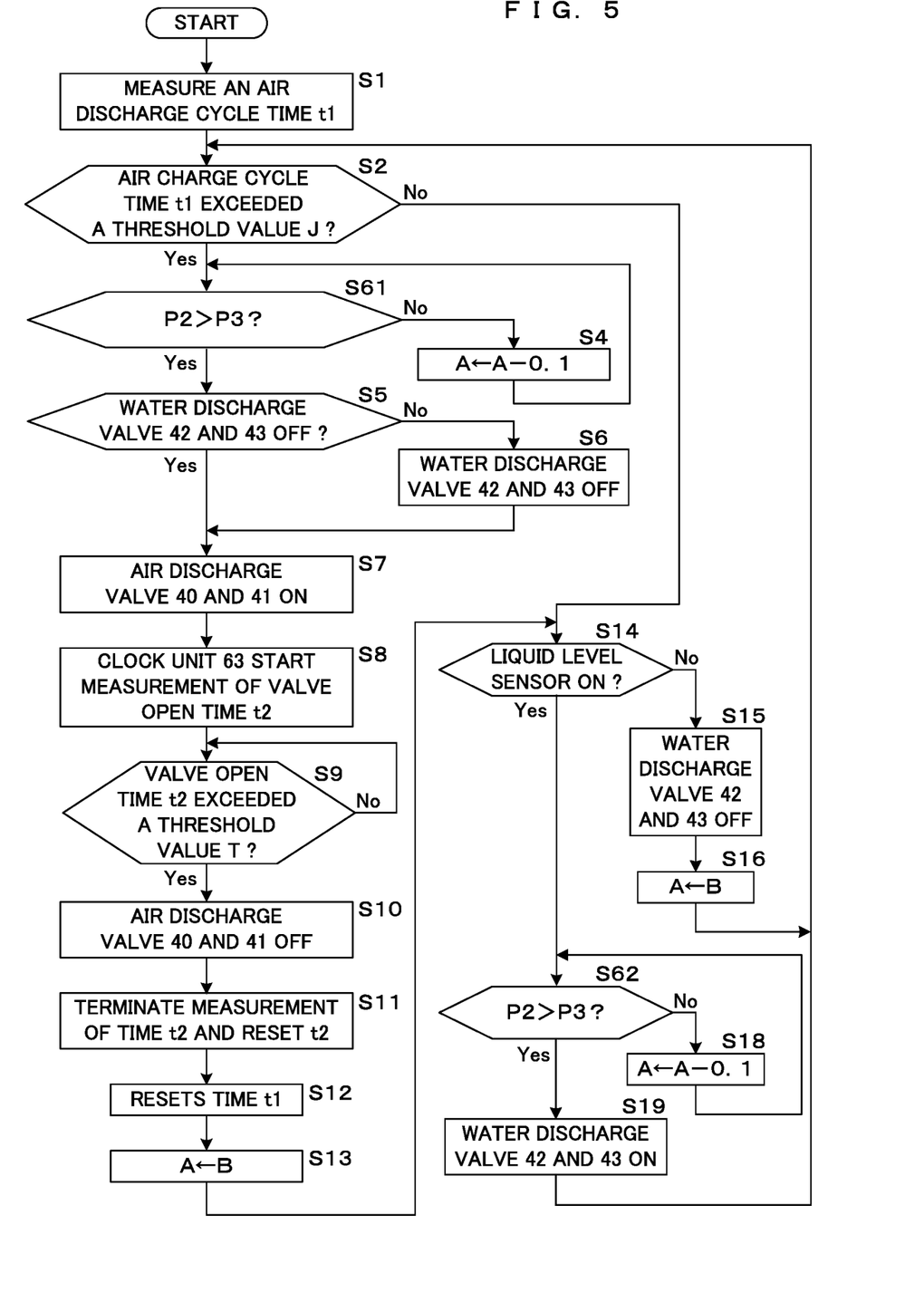
FIG. 5 is a flowchart illustrating the process procedures of air discharge and water discharge according to the third embodiment.

FIG. 5 is a flowchart illustrating the process procedures of air discharge and water discharge by the CPU 60. Step S61 in FIG. 5 corresponds to step S3 of First Embodiment. Moreover, step S62 corresponds to step S17 of First Embodiment. Steps excluding steps S61 and S62 of Third Embodiment are similar to First Embodiment, and therefore detailed description thereof will be omitted.

In step S61, the CPU 60 determines whether P2>P3 is satisfied or not (S61). When determining that P2>P3 is not satisfied (S61: NO), the CPU 60 advances the processing to step S4. When determining that P2>P3 is satisfied (S61: YES), the CPU 60 advances the processing to step S5. That is, 0.1 volt is subtracted each time from the hydrogen circulation pump command voltage A until the pressure at the inlet of the hydrogen circulation pump 39 becomes higher than the atmospheric pressure.

In step S62, the CPU 60 determines whether P2>P3 is satisfied or not (S62). When determining that P2>P3 is not satisfied (S62: NO), the CPU 60 advances the processing to step S18. When determining that P2>P3 is satisfied (S62: YES), the CPU 60 advances the processing to step S19. That is, 0.1 volt is subtracted each time from the hydrogen circulation pump command voltage A until the pressure at the inlet of the hydrogen circulation pump 39 becomes higher than the atmospheric pressure.

With Third Embodiment in which the rotational speed of the hydrogen circulation pump 39 is lowered and the pressure at the inlet of the hydrogen circulation pump 39 is made higher than the atmospheric pressure at the time of air discharge or water discharge, it is possible to sufficiently discharge impurities and water.

In Third Embodiment, the air discharge valve 40 and the air discharge valve 41 are not put into an open state simultaneously with the water discharge valve 42 and the water discharge valve 43. Therefore, the pressure in the hydrogen circulation passage 31 is not excessively lowered by water discharge during air discharge, and impurities can be sufficiently discharged. Moreover, when a set air discharge cycle time comes during water discharge, water discharge is interrupted, and air discharge is prioritized. It is therefore possible to sufficiently discharge impurities without being affected by water discharge.

Fourth Embodiment

Next, Fourth Embodiment will be described with reference to FIG. 6. Fourth Embodiment is different from Third Embodiment in process procedures of air discharge and water discharge. It is to be noted that the structure excluding the process procedures of air discharge and water discharge is similar to Third Embodiment described above, and therefore detailed description thereof will be omitted.

<Purge Control Program>

Figure 6:
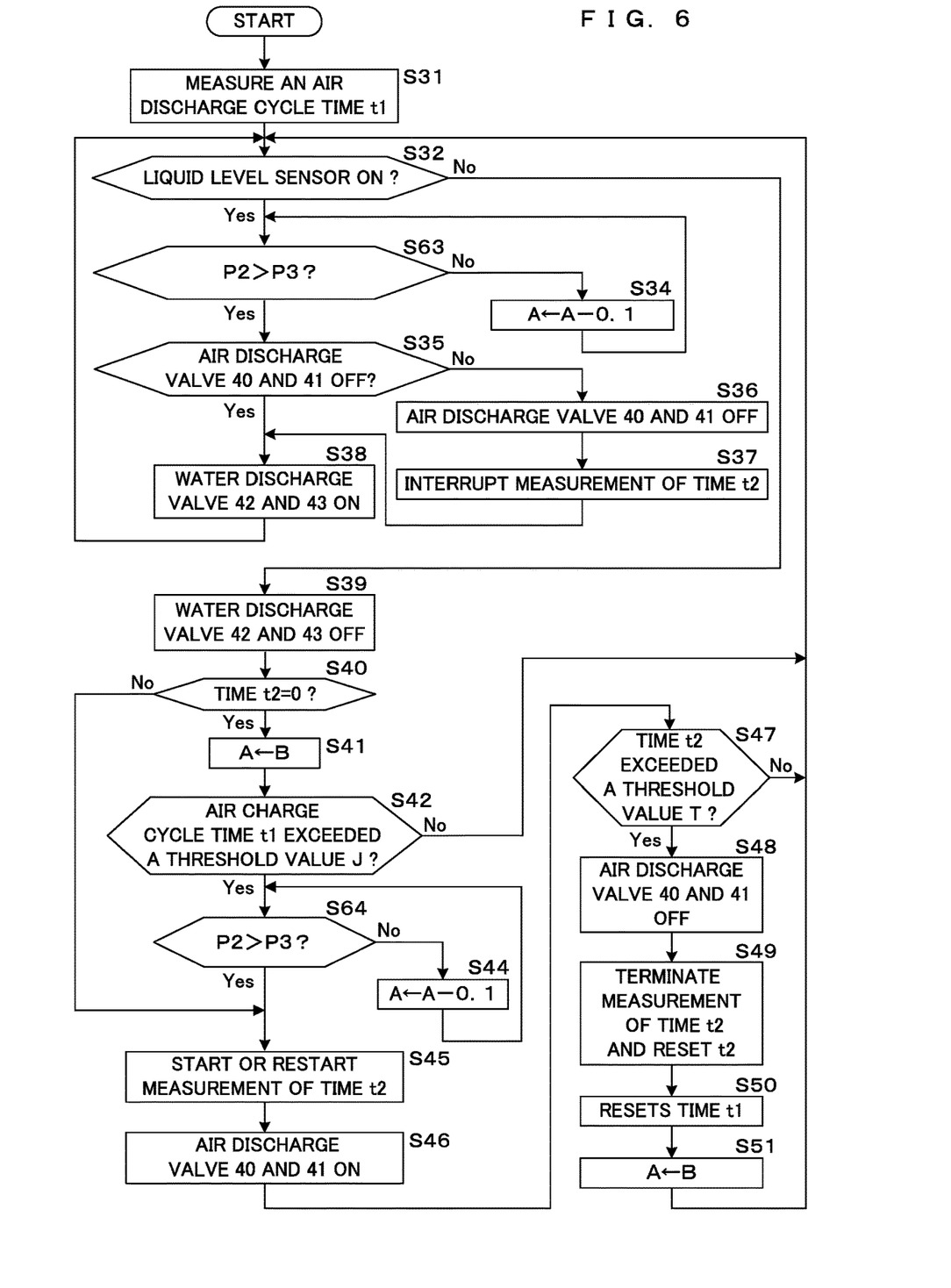
FIG. 6 is a flowchart illustrating the process procedures of air discharge and water discharge according to the fourth embodiment.

FIG. 6 is a flowchart illustrating process procedures of air discharge and water discharge by the CPU 60. Step S63 in FIG. 6 corresponds to step S33 of Second Embodiment. Moreover, step S64 corresponds to step S43 of Second Embodiment. Steps excluding steps S63 and S64 of Fourth Embodiment are similar to Second Embodiment, and therefore detailed description thereof will be omitted.

In step S63, the CPU 60 determines whether P2>P3 is satisfied or not (S63). When determining that P2>P3 is not satisfied (S63: NO), the CPU 60 advances the processing to step S34. When determining that P2>P3 is satisfied (S63: YES), the CPU advances the processing to step S35. That is, 0.1 volt is subtracted each time from the hydrogen circulation pump command voltage A until the pressure at the inlet of the hydrogen circulation pump 39 becomes higher than the atmospheric pressure.

In step S64, the CPU 60 determines whether P2>P3 is satisfied or not (S64). When determining that P2>P3 is not satisfied (S64: NO), the CPU 60 advances the processing to step S44. When determining that P2>P3 is satisfied (S64: YES), the CPU advances the processing to step S45. That is, 0.1 volt is subtracted each time from the hydrogen circulation pump command voltage A until the pressure at the inlet of the hydrogen circulation pump 39 becomes higher than the atmospheric pressure.

With Fourth Embodiment in which the rotational speed of the hydrogen circulation pump 39 is lowered and the pressure at the inlet of the hydrogen circulation pump 39 is made higher than the atmospheric pressure at the time of air discharge or water discharge, it is possible to sufficiently discharge impurities and water.

In Fourth Embodiment, the air discharge valve 40 and the air discharge valve 41 are not put into an open state simultaneously with the water discharge vale 42 and the water discharge valve 43. Therefore, the pressure in the hydrogen circulation passage 31 is not excessively lowered by air discharge during water discharge, and water can be sufficiently discharged. Moreover, in a case where the liquid level sensor is turned on during air discharge, air discharge is interrupted, and water discharge is prioritized. It is therefore possible to reliably discharge water without being affected by air discharge.

The first pressure gauge 34 is an example of first pressure detection means. The tachometer 45 is an example of rotational speed detection means. The second pressure gauge 46 is an example of second pressure detection means of the present invention.

The present disclosure is not limited to the contents of the embodiments described above, and various modifications can be employed. That is, the technical scope of the present disclosure also includes embodiments obtained by combining technical measures modified arbitrarily.

It is to be noted that, as used herein and in the appended claims, the singular forms "a", "an", and "the" include plural referents unless the context clearly dictates otherwise. It should be understood that the embodiments disclosed herein are illustrative and non-restrictive in every respect. The technical features described in the examples may be combined with one another, while all changes that fall within metes and bounds of the claims, or equivalence of such metes and bounds thereof are intended to be embraced by the scope of the present invention.

What is claimed is:

1. A fuel cell system, comprising:
   a fuel cell stack configured to react hydrogen and oxygen so as to generate electricity;
   a hydrogen supply passage for supplying hydrogen to the fuel cell stack;
   a hydrogen circulation passage for returning anode waste gas discharged from an anode of the fuel cell stack to the hydrogen supply passage;
   a hydrogen circulation pump that is provided at the hydrogen circulation passage, has an inlet and an outlet, and operates to circulate the anode waste gas;
   a waste gas discharge passage for discharging the anode waste gas to outside, the waste gas discharge passage being branched from a part of the hydrogen circulation passage between the anode and the inlet of the hydrogen circulation pump;
   a first discharge valve configured to put the waste gas discharge passage into an open state or a close state;
   a gas-liquid separator that is disposed at the hydrogen circulation passage and can separate a water component included in the anode waste gas;
   a water discharge passage for discharging the water component separated by the gas-liquid separator to outside, the water discharge passage being connected with the gas-liquid separator;
   a second discharge valve configured to put the water discharge passage into an open state or a close state; and
   a control unit configured to switch the first discharge valve and the second discharge valve into an open state or a close state,
   wherein the control unit performs control to deviate a period when the first discharge valve is in an open state and a period when the second discharge valve is in an open state from each other.

2. The fuel cell system according to claim 1, wherein the control unit keeps the second discharge valve in a close state in a period when the first discharge valve is in an open state.

3. The fuel cell system according to claim 1, further comprising a liquid level sensor that is provided at the water discharge passage and is located between the gas-liquid separator and the second discharge valve,
   wherein the control unit puts the second discharge valve into an open state in a case where the liquid level sensor detects that a predetermined amount of water is stored in the water discharge passage, or puts the first discharge valve into a close state in a period when the second discharge valve is in an open state.

4. The fuel cell system according to claim 2, wherein the control unit puts the first discharge valve into an open state after putting the second discharge valve into a close state in a case where the first discharge valve is to be put into an open state in a period when the second discharge valve is in an open state.

5. The fuel cell system according to claim 3, wherein the control unit puts the second discharge valve into an open state after putting the first discharge valve into a close state in a case where the liquid level sensor detects that a predetermined amount of water is stored in the water discharge passage in a period when the first discharge valve is in an open state.

6. The fuel cell system according to claim 1, wherein the control unit controls operation of the hydrogen circulation pump in a manner such that pressure of the anode waste gas at the inlet of the hydrogen circulation pump becomes higher than atmospheric pressure in the process of putting the first discharge valve into an open state.

7. A control method of controlling a first discharge valve and a second discharge valve by a control unit of a fuel cell system comprising:
   a fuel cell stack configured to react hydrogen and oxygen so as to generate electricity;
   a hydrogen supply passage for supplying hydrogen to the fuel cell stack;
   a hydrogen circulation passage for returning anode waste gas discharged from an anode of the fuel cell stack to the hydrogen supply passage;
   a hydrogen circulation pump that is provided at the hydrogen circulation passage, has an inlet and an outlet, and operates to circulate the anode waste gas;
   a waste gas discharge passage for discharging the anode waste gas to outside, the waste gas discharge passage being branched from a part of the hydrogen circulation passage between the anode and the inlet of the hydrogen circulation pump;
   a first discharge valve configured to put the waste gas discharge passage into an open state or a close state;
   a gas-liquid separator that is disposed at the hydrogen circulation passage and can separate a water component included in the anode waste gas;
   a water discharge passage for discharging the water component separated by the gas-liquid separator to outside, the water discharge passage being connected with the gas-liquid separator;
   a second discharge valve configured to put the water discharge passage into an open state or a close state; and
   a control unit configured to control the first discharge valve and the second discharge valve,
   wherein the control unit performs control to deviate a period when the first discharge valve is in an open state and a period when the second discharge valve is in an open state from each other.

8. A non-transitory computer-readable recording medium recoding a computer program of a control unit of a fuel cell system comprising:
   a fuel cell stack configured to react hydrogen and oxygen so as to generate electricity;
   a hydrogen supply passage for supplying hydrogen to the fuel cell stack;
   a hydrogen circulation passage for returning anode waste gas discharged from an anode of the fuel cell stack to the hydrogen supply passage;
   a hydrogen circulation pump that is provided at the hydrogen circulation passage, has an inlet and outlet, and operates to circulate the anode waste gas;

a waste gas discharge passage for discharging the anode waste gas to outside, the waste gas discharge passage being branched from a part of the hydrogen circulation passage between the anode and the inlet of the hydrogen circulation pump;

a first discharge valve configured to put the waste gas discharge passage into an open state or a close state;

a gas-liquid separator that is disposed at the hydrogen circulation passage and can separate a water component included in the anode waste gas;

a water discharge passage for discharging the water component separated by the gas-liquid separator to outside, the water discharge passage being connected with the gas-liquid separator; and a second discharge valve configured to put the water discharge passage into an open state or a close state, wherein the control unit switches the first discharge valve and the second discharge valve into an open state or a close state, and the computer program causes the control unit to execute a process of performing control to deviate a period when the first discharge valve is in an open state and a period when the second discharge valve is in an open state from each other.

* * * * *